(12) United States Patent  
Ruff

(10) Patent No.: US 9,484,786 B2  
(45) Date of Patent: Nov. 1, 2016

(54) INDUCTION GENERATOR

(75) Inventor: Eduard Ruff, Auerbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 1049 days.

(21) Appl. No.: 13/636,309

(22) PCT Filed: Feb. 17, 2011

(86) PCT No.: PCT/EP2011/052327  
§ 371 (c)(1),  
(2), (4) Date: Dec. 5, 2012

(87) PCT Pub. No.: WO2011/117031  
PCT Pub. Date: Sep. 29, 2011

(65) Prior Publication Data  
US 2013/0069451 A1      Mar. 21, 2013

(30) Foreign Application Priority Data

Mar. 23, 2010  (DE) .................. 10 2010 003 151  
Mar. 23, 2010  (DE) .................. 10 2010 003 152  
May 5, 2010   (DE) .................. 10 2010 028 622

(51) Int. Cl.  
*H02K 7/18*      (2006.01)  
*H02K 35/02*    (2006.01)

(52) U.S. Cl.  
CPC ............ *H02K 7/1869* (2013.01); *H02K 35/02* (2013.01); *H01H 2239/076* (2013.01)

(58) Field of Classification Search  
CPC ... H02K 7/1876; H02K 57/003; H02K 35/02  
USPC ................................ 310/12.12; 335/278, 80  
See application file for complete search history.

(56) References Cited

U.S. PATENT DOCUMENTS

| | | | |
|---|---|---|---|
| 3,693,033 A | 9/1972 | Troesh | |
| 4,142,166 A | 2/1979 | Arnoux | |
| 4,553,118 A * | 11/1985 | Agatahama | H01H 51/2227 335/128 |
| 4,560,966 A * | 12/1985 | Nagamoto | H01H 51/2209 335/80 |
| 8,228,151 B2 | 7/2012 | Schmidt | |
| 2005/0035600 A1 | 2/2005 | Albsmeier et al. | |

(Continued)

FOREIGN PATENT DOCUMENTS

| | | |
|---|---|---|
| DE | 27 28 629 A1 | 1/1978 |
| DE | 198 52 470 A1 | 5/2000 |

(Continued)

OTHER PUBLICATIONS

International Search Report and Written Opinion issued in international application No. PCT/EP2011/052327, mailed Aug. 19, 2011 (13 pages including translation of the ISR).

*Primary Examiner* — Terrance Kenerly  
(74) *Attorney, Agent, or Firm* — Brinks Gilson & Lione

(57) ABSTRACT

An induction generator for a radio switch having a magnet element as well as an induction coil with a coil core, characterized in that the coil core is U-shaped, wherein a first contact position and a second contact position for the magnet element are defined on the limbs of the coil core, with a flux direction reversal taking place in each case in the coil core when a change takes place between said positions, wherein the magnet element is arranged such that it can move in a defined manner linearly between the contact positions on the induction generator in a direction in which the limbs are adjacent to one another.

8 Claims, 3 Drawing Sheets

(56) References Cited

U.S. PATENT DOCUMENTS

Figure 5:
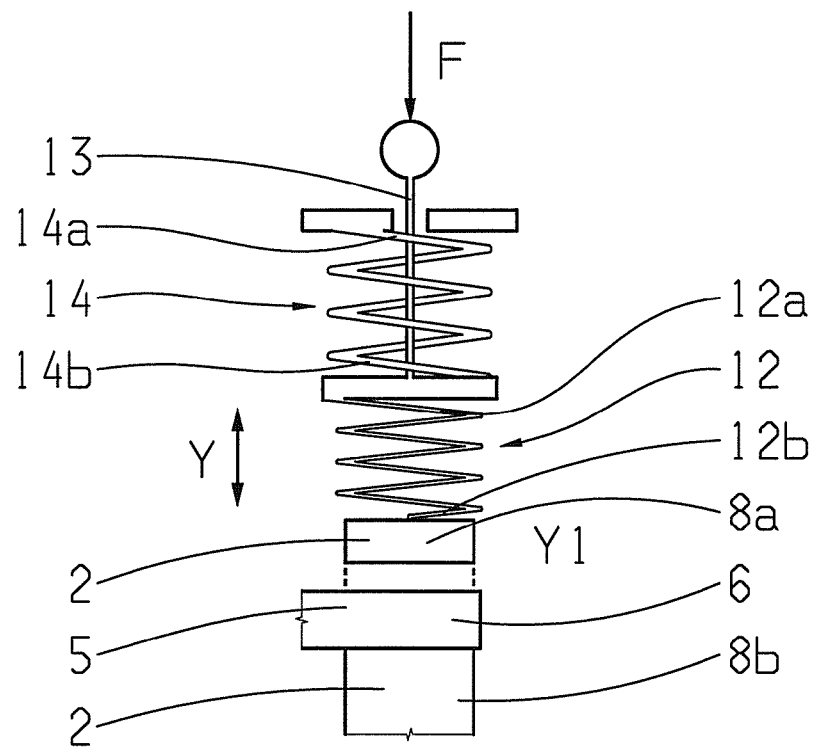

| | | | |
|---|---|---|---|
| 2006/0091984 A1* | 5/2006 | Schmidt | H02K 35/04 335/78 |
| 2008/0217926 A1* | 9/2008 | Lemieux | H02K 35/02 290/1 R |
| 2008/0315595 A1 | 12/2008 | Bataille et al. | |

FOREIGN PATENT DOCUMENTS

| | | |
|---|---|---|
| DE | 101 25 059 A1 | 12/2002 |
| DE | 103 15 765 B4 | 12/2006 |
| WO | 2004/093299 A1 | 10/2004 |

* cited by examiner

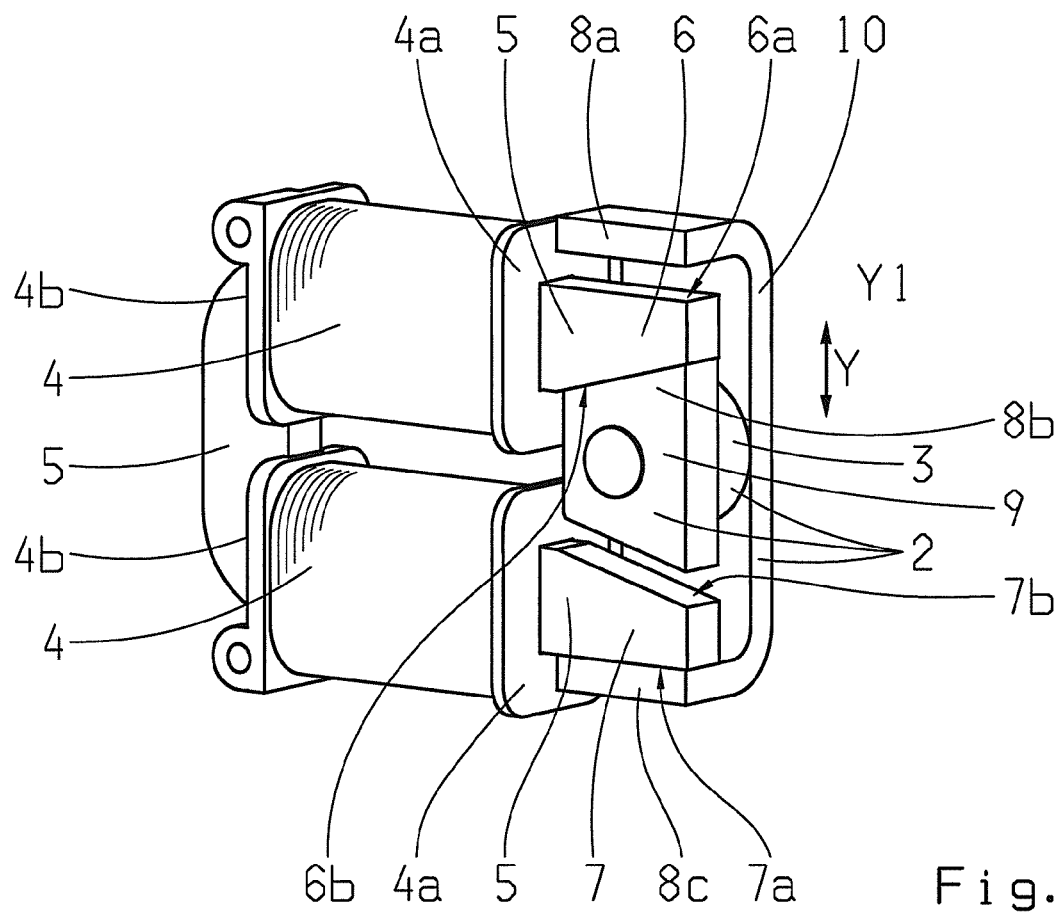
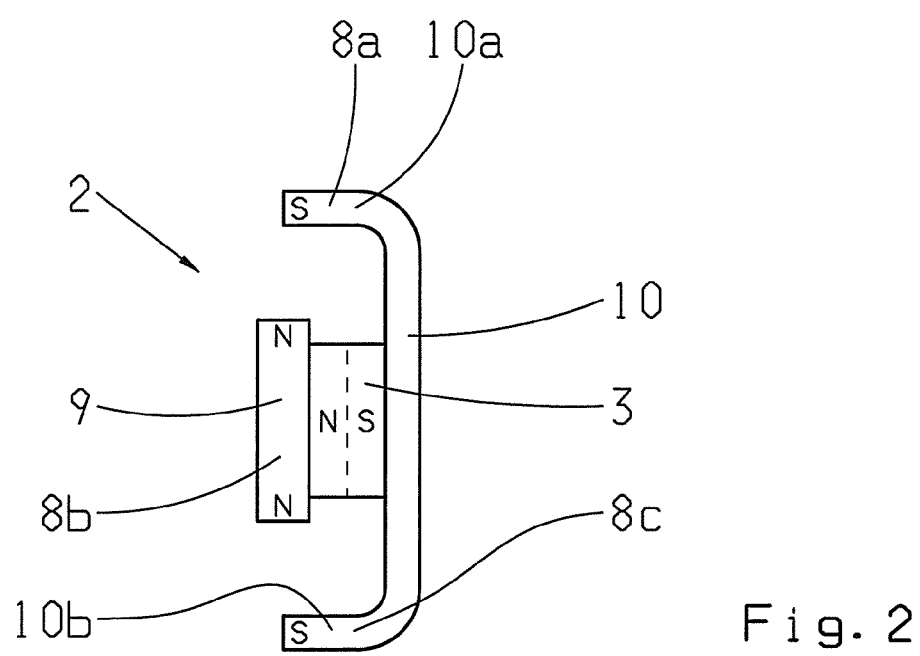
Fig. 1
Fig. 2

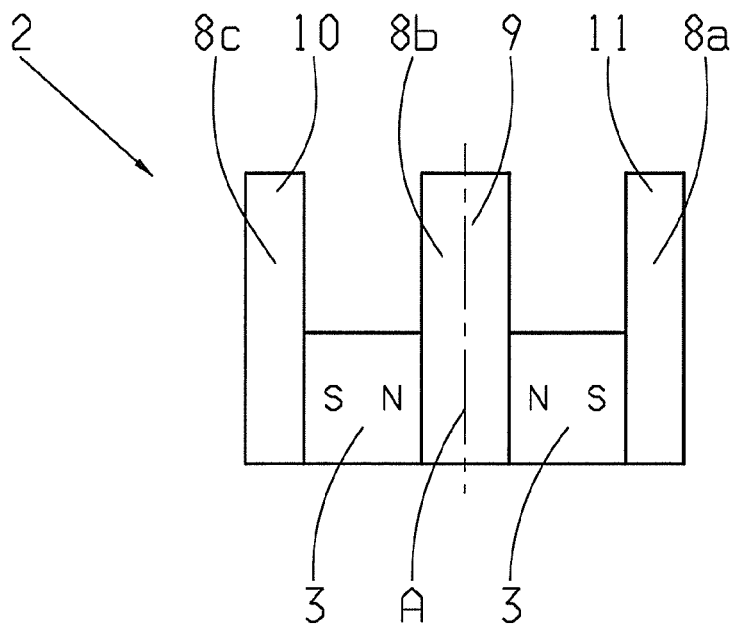
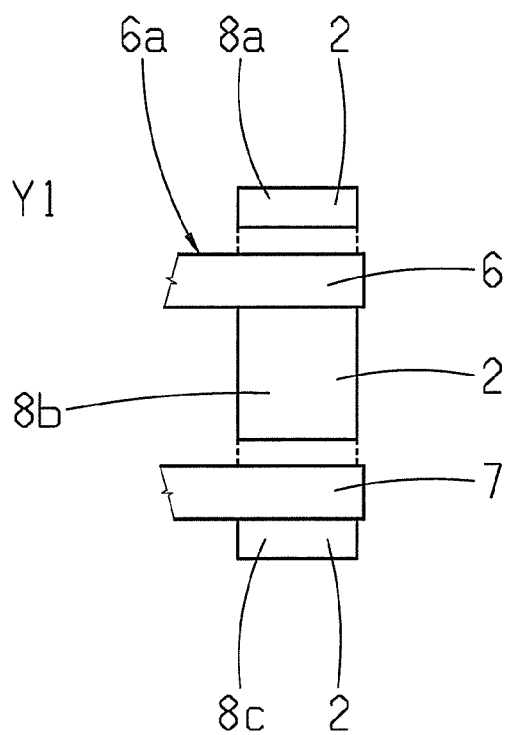
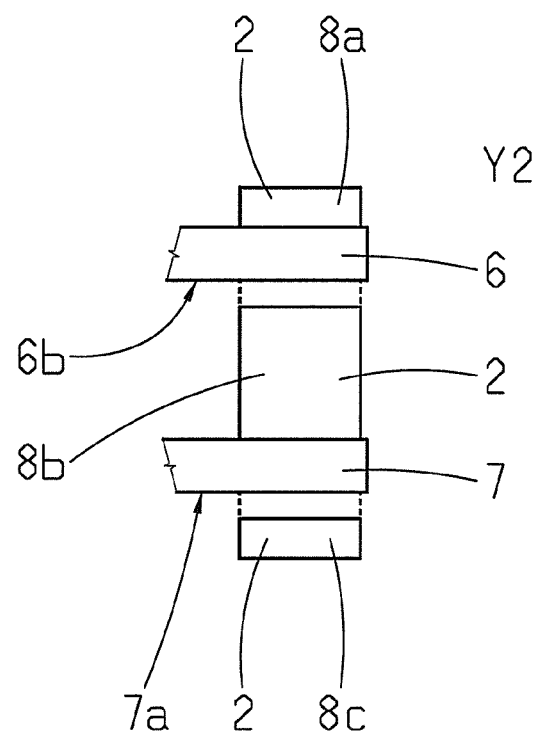
Fig. 3
Fig. 4a
Fig. 4b

INDUCTION GENERATOR

This application is a filing under 35 U.S.C. §371 of International Patent Application PCT/EP2011/052327, filed Feb. 17, 2011, which claims priority to German Application No. 10 2010 003 151.8, filed Mar. 23, 2010; German Application No. 10 2010 003 152.6, filed Mar. 23, 2010; and German Application No. 10 2010 028 622.2, filed May 5, 2010, each of which is incorporated be reference herein in its entirety.

The present invention concerns an induction generator for a radio-controlled switch according to the preamble of Claim 1.

In the prior art, numerous induction generators are proposed which, like the present one, can be used in an energy self-sufficient radio-controlled switch.

For example, the publication DE 101 25 059 A1 shows an inductive voltage generator comprising a mechanical energy storage device. The energy storage device stores actuating energy until a distribution point is reached. When reaching the distribution point, a permanent magnet of the induction system moves abruptly. As a result of the movement the magnetic flow changes abruptly, whereupon the permanent magnet impacts the core at the beginning or end of the movement.

The publication U.S. Pat. No. 3,693,033 shows a pulse generator designed as a sensing device in which the core of a first permanent magnet is submerged in a coil when moving the sensing device. The magnetic field of a further permanent magnet retains the first permanent magnet until the actuating energy introduced in the sensing device allows for a quick release and submersion in the coil, resulting in a short voltage signal.

The DE 103 15 765 B4 shows an electromagnetic energy converter in which an element surrounded by a coil can be moved in rotary motion in relation to a permanent magnet, wherein in a first and a second rest position the magnetic flow is closed respectively by the moving element. The energy converter is designed in such a way that even during slow actuation sufficient energy is converted for operating a radio-controlled switch. Thus, through actuation between the first and second position, the moving element can fold down after overcoming the magnetic forces.

The DE 198 52 470 A1 shows a power generation system in which permanent magnets in an oscillating circuit are moved past an induction coil arrangement.

To design a radio-controlled switch like the one discussed in a manner that it can be extremely miniaturized it is required that even when the induction system has a small overall size a high amount of electrical energy has to be generated from the mechanical actuation process of the switch. In this regard, the known switches have room for improvement.

On this basis, the present invention has the objective of proposing an alternative induction system for a radio-controlled switch that can be miniaturized, wherein the radio-controlled switch generates a high amount of energy even when the induction system has a small overall size.

According to the invention, this problem is solved with the characteristics of Claim 1.

The invention proposes an induction generator for a radio-controlled switch with a magnetic element and an induction coil with a coil core, wherein the coil core has a U-shaped design, wherein for the magnetic element a first and a second support position is defined at the legs of the coil core where, during the process of changing positions, a flow direction reversal takes place respectively in the core, wherein the magnetic element is arranged in a direction in which the legs are adjoining each other, between the support positions where they can move in linear fashion at the induction generator.

In an invention-based embodiment of the induction generator, the magnetic element forms three support elements of different magnetic polarity in the direction in which the legs are adjoining each other, wherein two adjoining support elements can be brought in position at the legs in each support position.

In a further invention-based embodiment of the induction generator, the magnetic element is arranged in linear movable fashion by means of a guiding device.

In another invention-based embodiment of the induction generator, the magnetic element has an E-shaped cross section.

According to one aspect of the invention-based induction generator, each of the legs of the coil core extends between two adjoining support elements of the magnetic element, in particular, they submerge between two adjoining legs of the E-shaped cross section.

According to a further aspect of the invention-based induction generator, the magnetic element interacts with a first mechanical spring mechanism in order to achieve mechanically accelerated motion between the support positions. Up to a specific energy level, said spring mechanism stores activation energy which allows the magnetic element to be released from the first or second support position when the energy level is exceeded. After leaving the support position, said activation energy can be released to accelerate the magnetic element.

According to another aspect of the invention-based induction generator, the induction generator comprises a second mechanical spring mechanism for generating a reset force in order to move the magnetic element from the second to the first support position which is formed integrally with or connected to the first mechanical spring mechanism.

The invention provides an induction generator, wherein the first and the second spring mechanism are designed integrally as bar-shaped spring elements, wherein a force-application area has been arranged in a central area of the bar-shaped spring element.

Furthermore, the invention provides an induction generator, wherein the bar-shaped spring element extends in a direction in which the legs are adjoining each other from a first front end of the induction coil to a further front end adjacent to the magnetic element, wherein a first end of the bar-shaped spring element is supported at the first end, and wherein a second end is connected with the magnetic element for introducing a force in the direction in which the legs are adjoining each other.

Moreover, the invention provides a radio-controlled switch with a transmitter assembly and an antenna, wherein the radio-controlled switch comprises an invention-based induction generator.

Further characteristics and advantages of the invention are included in the subsequent description of embodiments of the invention, the figures of the drawings showing important details of the invention and the claims. The individual characteristics can be implemented individually or in a variety of combinations for any model of the invention.

Figure 6:
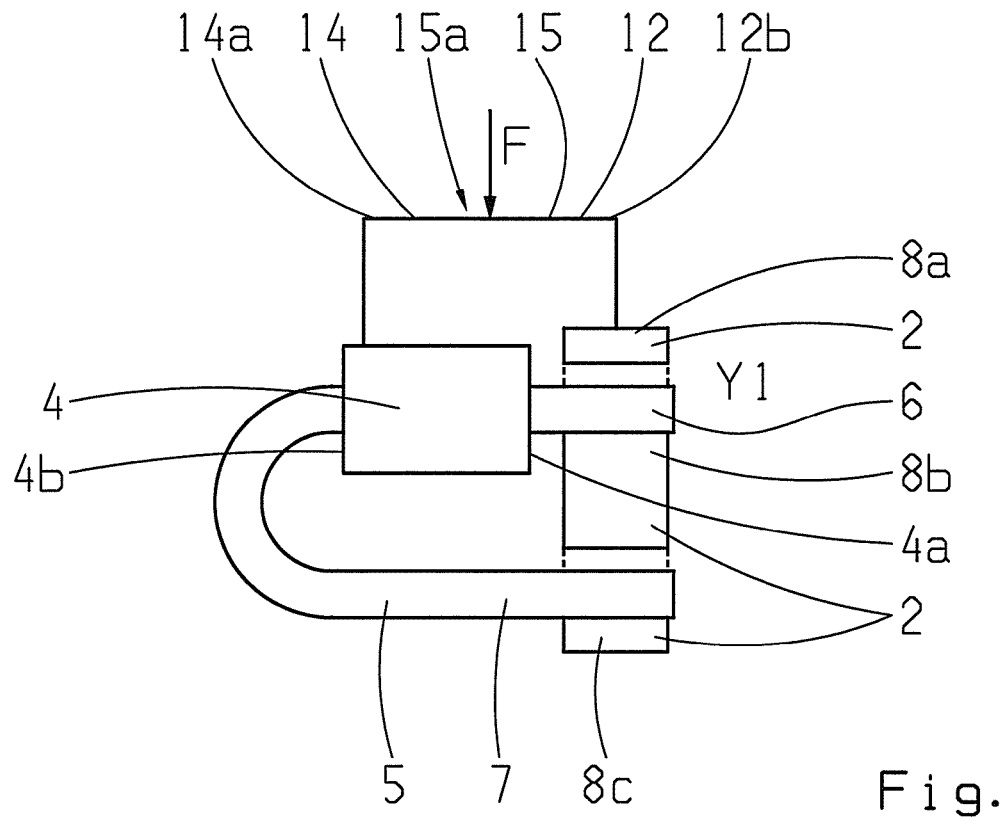

Subsequently, preferred embodiments of the invention are described by means of the enclosed drawings. It is shown:

FIG. 1 an exemplary view of an induction system of an invention-based induction generator according to an embodiment of the invention; and FIG. 2 an exemplary magnetic element for forming an induction generator according to an embodiment of the invention;

FIG. 3 an exemplary magnetic element for forming an induction generator according to a further embodiment of the invention;

FIGS. 4a) and b) an exemplary interaction of the magnetic element according to FIGS. 1 and 2 with the legs in the first and second support position;

FIG. 5 an exemplary interaction of the magnetic element with a first and/or a second mechanical spring mechanism according to an embodiment of the invention; and FIG. 6 an exemplary induction system with a bar-shaped spring element according to an embodiment of the invention.

In the subsequent description and the drawings, identical elements or comparable functions are provided with the same reference numerals.

FIG. 1 shows an exemplary induction system 1 of an invention-based induction generator. In particular, such an induction generator can be used in radio-controlled switches. The invention-based induction generator allows for releasing an extremely high amount of energy in relation to the achievable miniaturizing degree. The induction generator can be provided with an extremely compact design, for example, as a micro generator, especially as an integrated module.

For energy production, the invention-based induction system 1 of the induction generator comprises a magnetic element 2 with at least one permanent magnet 3, as well as at least one induction coil 4 with a U-shaped coil core 5 (for example, FIG. 6).

For example, the induction system 1 comprises two induction coils 4 with a mutual coil core 5 (FIG. 1), for example, a double coil or two separately wound coils. For example, two induction coils 4 in smallest dimension could generate considerably more energy than a single coil. In particular, the magnetic element 2 is arranged in such a way that it is adjoining the front end 4a of the induction coil 4 where the ends of the legs 6, 7 of the coil core 5 are exposed.

As shown in the diagram in FIGS. 4a) and b), according to the invention, the magnetic element 2 can be moved in linear fashion (back and forth) between two defined rest positions or defined support positions Y1, Y2 in a direction in which the legs 6, 7 are adjoining each other (Y direction in FIG. 1), wherein in each support position the magnetic element 2 is brought in position simultaneously at both legs 6, 7, respectively, especially at the (exposed) ends of the legs. As a result, a closed magnetic ring flow is produced in each support position Y1, Y2 by means of the magnetic element 2 and coil core 5. Because of the linear movement of the magnetic element 2, it is possible to maintain a compact induction system 1 and thus a compact induction generator. To this end, it is preferred that the legs 6, 7 extend in parallel.

In particular, the magnetic element 2 forms three adjacent pole elements or support elements 8a, b, c of different, alternating polarity, i.e., magnetic North and South, in the direction in which the legs 6, 7 are adjoining each other, in order to be able to reverse the polarity of the coil core 5 when the support positions of the coil core 5 are changed. For example, two support positions 8a, 8c of similar polarity are provided to contact the external side 6a, 7a of the respective leg 6, 7 in the intended direction of motion, depending on the respective support position Y1 or Y2, while a further support element 8b of different polarity can contact a respective internal side 6b, 7b facing this direction.

According to the invention, the support element 8b for contacting an internal side 6b, 7b in a support position Y1 or Y2 is brought in position at the respective leg 6 or 7 at which there is no support element 8a, 8c for contacting an external side 6a, 7a and vice versa.

By means of such a magnetic element 2, which preferably is E-shaped or has an E-shaped cross section (for example, FIGS. 2 and 3) and the legs of which are formed by means of the support elements 8a, 8b, 8c, it is possible for a pair of support elements 8b, 8c of first differing polarity to rest at the legs 6, 7 in the first support position Y1 of the magnetic element 2 corresponding to a starting position (FIG. 1), for example, magnetic North (N) at the first leg 6 and magnetic South (S) at the second leg 7, while in the second support position Y2 (magnetic element linearly displaced) a pair of support elements 8a, 8b rests at the legs 6, 7 with inverted polarity in comparison to the first support position Y1, i.e., for example, magnetic South (S) at the first leg 6 and magnetic North (N) at the second leg 7. The E-shape makes it possible that the legs 6, 7 are able to extend or submerge into the magnetic element 3. It is also possible to use other designs.

The perspective view of FIG. 1 and the schematic cross section of FIG. 2 show in an exemplary manner an invention-based magnetic element 2 that has an asymmetric design. For example, the magnetic element 2 consists of a permanent magnet 3 which forms a magnetic north pole (N) and a magnetic south pole (S) in a direction transverse to the direction in which the legs 6, 7 are adjoining each other, as well as adjacent pole shoes 9, 10. For example, the first pole shoe 9, which is designed in the form of a trapeze, is provided to rest against the respective internal sides 6b, 7b that are correspondingly tapered and, because of its connection to the permanent magnet 3, it has a first polarity. Possibly together with the permanent magnet 3, the first pole shoe 9 forms the central leg of the E-shaped magnet element 2.

In the course of a linear motion of the magnetic element 2, the first pole shoe 9 can be brought in position at one of the legs 6 or 7 when reaching one of the support positions Y1 or Y2 and at the other leg 7 or 6 when reaching the other support position Y2 or Y1, especially at one of the respective internal sides of the legs 6b, 7b in the direction of motion.

The second pole shoe 10, which because of its connection with the permanent magnet 3, has a second polarity differing from the polarity of the first pole shoe 9, extends adjacent to the legs 6, 7 in the direction in which the legs are adjoining each other. For example, the second pole shoe 10 has the shape of a clamp or a bracket. The end sections 10a, 10b correspond with the external legs of the E-shaped magnetic elements or the legs of the bracket form and respectively form a support element 8a, 8c to be brought in position at one of the legs 6, 7. In the course of a linear motion, one end section at a time can be brought in position against the one leg 6 or the other leg 7, especially at one external side of the leg 6a, 7a positioned in the direction of motion.

In particular, the support elements 8a, b, c, for example, in the form of the pole shoe 9 or the end sections 10a, 10b, form support elements for the submerged legs 6, 7 which restrict the extent of the motion of the magnetic element 2 in the induction generator in relation to the legs 6, 7.

In the course of a linear motion of the magnetic element 2, when reaching one of the support positions Y1 or Y2, one of the support elements 8c or 8a of the second pole shoe 10 can be brought in position with the other leg 7 or 6, when reaching the other support position Y2 or Y1, the other support element 8*a* or 8*c* can be brought in position with one of the legs 6 or 7.

In the embodiment shown, both pole shoes 9, 10 are particularly rigidly connected for mutual movement by means of the permanent magnet 3.

FIG. 3 shows a diagram of a further embodiment of an invention-based magnetic element 2 which advantageously has a symmetrical design with regard to a central axis A. For example, the magnetic element 2 according to FIG. 3 comprises two permanent magnets 3 and three cube-shaped pole shoes 9, 10, 11. Between two pole shoes 9, 10 or 9, 11, one permanent magnet is arranged, respectively, in such a way that by means of the pole shoes 9, 10, 11 three support elements 8*a*, 8*b*, 8*c* of differing, alternating polarity are formed. The permanent magnets 3 with the same polarity each point in the direction of the central pole shoe 9. The magnetic element 2 thus formed, in turn, comprises especially an E-shaped cross section, wherein the pole shoes 9, 10, 11 form the legs of the E-form between which the legs 6, 7 of the coil core 5 can submerge. For example, the legs 6, 7 comprise support surfaces 6*b*, 7*b* that are not beveled.

An arrangement in which the magnetic element 2 can be brought simultaneously in position at an internal side 6*b*, 7*b* of a leg 6, 7 and an external side 7*a*, 6*a* of a different leg 7, 6, respectively, can be made possible by selecting the distance between the (external) support elements 8*a*, 8*c* in Y direction minus the smaller distance of the external sides of the legs 6*a*, 7*a* equal the distance of the internal sides of the legs 6*b*, 7*b* minus the smaller extension of the (internal) support element 8*b* in Y direction, wherein the magnetic element 2, as well as the legs 6, 7 each have a symmetric level which extends in a transverse direction. By means of such an arrangement, an abrupt separation between the magnetic element 2 and the legs 6, 7 can take place by exerting a force in the intended direction Y of motion because in addition to the magnetic retention force almost no friction force is exerted on the support elements 8*a, b, c*.

For example, to form an invention-based magnetic element 2, the pole shoes 9, 10 and possibly 11 are injection-molded together with the permanent magnet(s) 3. Especially by means of the magnetic element 2 with the symmetric design, it is possible to achieve a simple and cost-effective structure of a space-saving induction generator.

In the solely linear motion between the support positions from leaving a support position Y1, Y2 up to assuming the further support position Y2, Y1, the invention-based magnetic element 2 can be brought out of position at the coil core 5 in such a way that it allows for a quick motion in relation to the legs 6, 7 with a change of the support positions Y1, Y2 along with a high amount of energy generated by the induction system 1.

Furthermore, according to the invention, the induction generator comprises a guiding device (not shown) which makes it possible after releasing the magnetic element 2 from a support position Y1 or Y2 to move it in a defined manner solely linear in the direction Y in which the legs are adjoining each other, i.e., in the other defined support position Y2 or Y1. The guiding device defines the support positions Y1, Y2 and the linear movement path, especially in connection with the support elements 8*a, b, c*.

For example, for guiding the magnetic element 2, the guiding device comprises a guide cage in which the magnetic element has been movably received in the intended direction Y and, at the same time, it can be secured against being released from the induction generator. In particular, such a guiding device can be designed at the front side 4*a* of the induction coil 4 facing the ends of the legs. For example, the guiding device can comprise a guiding link or a profile rail running in the direction of motion Y, in which profile rail at least one guided element of the magnetic element 2, 2', for example, an engagement member, is captured or guided. For example, the guiding device is formed integrally with a coil body of the induction coil 4, for example, as a plastic part.

To be able to move the magnetic element 2 at the induction generator between the support positions Y1 or Y2 in linear fashion in the direction in which the legs 6, 7 are adjoining each other, it is possible to introduce in the magnetic element 2*a* force, i.e., a release force in this direction. For this purpose, the induction generator comprises, for example, an engagement member for activation, for example, a control element, by means of which an actuating force F corresponding to the release force can have an effect on the magnetic element 2. For example, the control element can be formed by the support element 8*a* or 8*c* or can be separate from it.

According to the invention, it has been particularly provided that the magnetic element 2 interacts with a first mechanical energy storage device or spring mechanism 12 in order to mechanically accelerate the motion between the support positions Y1, Y2 (FIG. 5), which energy storage device stores up to a specific energy level activation energy, i.e., for achieving or enforcing energy-impinged motion. When the energy level has been exceeded, it is intended to release the magnetic element 2 from the first Y1 or second Y2 support position and to affect a linear motion in the other support position Y2 or Y1, wherein, according to the invention, the stored energy can be released for accelerating the magnetic element 2 after leaving the support position Y1 or Y2.

For this purpose, the first mechanical spring mechanism 12 is designed as an engagement member for actuating the induction generator or it comprises an engagement member 13 in such a way that an actuating force F corresponding to a release force can be introduced directly in the first mechanical spring mechanism 12. As soon as the mechanical spring mechanism 12 has stored release energy up to the pre-determined energy level, it is possible to release further supplied energy to the magnetic element 2.

For example, an appropriate first mechanical spring mechanism 12 is designed as a resiliently malleable element and is connected with the magnetic element 2 for force application in an intended direction of motion Y. When reaching an intended deformation of the first mechanical spring mechanism 12, resulting, for example, from an actuation corresponding to a specific energy level, it is possible because of the increasing rigidity combined with continuous force transmission in the first mechanical spring mechanism 12 that as a result of the coupling additional power is transferred in the intended direction of motion Y on the magnetic element retained at the coil core 5 through the magnetic retention forces, and the magnetic element 2 is moved out of the support position Y1 or Y2.

For example, the first mechanical spring mechanism 12 coupled to a magnetic element 2 is designed as a coil spring which can be elastically deformed by transmitting a force, i.e., a release force, until a specific energy level is reached. To achieve a movement from the first Y1 into the second Y2 support position, the coil spring is compressed while it is expanded during a backward movement. For example, the first mechanical spring mechanism 12 comprises a first end portion 12*a* for introducing a release force or as an engagement contact, while a further end portion 12*b* is coupled with the magnetic element 2 or counteracts the magnetic element 2. Because of the force transmission, the first end portion 12*a* can be displaced in relation to the second end portion 12*b*, i.e., it is not stationary, thus allowing energy to be stored through elastic deformation. Alternatively, it is possible to design the first mechanical spring mechanism 12 as a leaf-shaped spring.

According to the invention, when introducing a motion of the magnet element 2 in combination with surmounting the magnetic retention force resulting from an introduction of a release force, the first mechanical spring mechanism 12 can release tension at the now largely unloaded end portion 12*b*, which is coupled with the magnetic element 2, and release the stored energy or dispense it, especially abruptly, to the magnetic element 2 for mechanically accelerating the movement in the other support position Y2.

According to the invention, the induction generator 1 can also comprise a second mechanical energy storage device or spring mechanism 14 for generating a reset force to move the magnetic element 2 from the second Y2 in the first Y1 support position, which energy storage device or spring mechanism 14 is formed or integrally connected with the first mechanical spring mechanism. The second mechanical spring mechanism 14, for example, in the form of a further resiliently malleable element, comprises a stationary end portion 14*a* in relation to the induction coil 4 and an end portion 14*b* that is connected with the first end portion 12*a* of the first mechanical spring mechanism 12. During the motion of the magnetic element 2 from the first Y1 to the second Y2 support position, the second energy storage device increasingly stores energy, for example, by means of increasing deformation. For example, the second mechanical spring mechanism 14 is designed as a coil spring and can be increasingly expanded when the magnetic element 2 is moved into the second support position Y2.

By means of the stored energy of the second mechanical spring mechanism, the magnetic element 2 can be moved back from the second support position Y2, i.e., when discontinuing an introduced actuating force. Appropriately, the second mechanical spring mechanism 14 has already been pretensioned in the first support position Y1 of the magnetic element 2 in a direction opposite to the actuating force direction, in such a way that the magnetic element 2 is pressed into the first support position Y1.

According to the invention, the first mechanical spring mechanism stores activation energy before moving out of the second support position Y2, which is caused by the reset force provided by the second mechanical spring mechanism 14 which impacts the first end portion 12*a* until a specific energy level is reached, for example, by means of another elastic deformation, and a release of the legs or a motion of the magnetic element 2 up to the first starting position Y1 can be produced. The stored activation energy in the first mechanical spring mechanism 12 is dispensed, especially abrupt, to the magnetic element 2 for the purpose of accelerating the motion in the course of a movement after releasing the legs 6, 7 in such a way that a high amount of energy resulting from an additional mechanically accelerated motion back to the first support position Y1 is achieved.

According to the invention, the first 12 and the second 14 mechanical spring mechanism are designed as an integral leaf-shaped spring element 15 or as a spring bar, for example, according to FIG. 6, for example, as a spring clamp which is stationary supported on one end portion 14*a* at the induction coil 4 and which is coupled on another end portion 12*b* to the magnetic element 2 for force transmission in the direction of motion Y. For example, the spring mechanism 15 can be produced cost-effectively from sheet metal as a punched flexible component.

A suitable invention-based bar-shaped spring member 15, for example in the form of a spring clamp which, at the same time, is provided as a force transmission element for an actuation force F extends, for example, in bar-shaped fashion from a front end 4*b* of the induction coil 4 facing away from the end of the leg up to the magnetic element 2 along the induction coil 4 adjacent to the Y direction, wherein the bar-shaped spring element 15 can be elastically deformed by introducing a force in the direction in which the legs 6, 7 are adjoining each other.

By selecting a force-application area between the ends 12*b*, 14*a*, for example, in a central area 15*a* of the bar-shaped spring element 15, the bar sections of the bar element adjacent to the force-application area 15*a* can store energy by means of elastic deformation when introducing an actuating force F until, as a result of increasing bending resistance, a motion of the magnetic element 2 or a release from the support position Y1 takes place. As a result of the motion, the bar section connected to the magnetic element 2, i.e., the first mechanical spring mechanism 12, can release tension and dispense energy to the magnetic element 2, while the bar section connected to the induction coil 4, i.e., the second mechanical spring mechanism 14, continues to be deformed in such a way that it is possible to generate a reset force which counteracts the direction of the actuating force. For example, in the force-application area 15*a*, an engagement member 13 for actuation has been arranged (not shown).

In the course of enforcing a motion back into the starting position Y1, the bar section 12 connected to the magnetic element 2 is first of all elastically deformed in opposite direction through the resetting release force of the second mechanical spring mechanism 14, resulting in the fact that through the tension release in the course of a backward movement energy can be released, which impacts in mechanically accelerating fashion the mechanical element 2 in the direction of the first starting position Y1. It should be noted that it is also possible to use an arrangement in which the bar-shaped spring mechanism 15 is tensile-loaded for actuation, wherein, for example, the starting position corresponds to the support position Y2.

For example, the invention-based induction generator can be used in a radio-controlled switch which comprises a transmitter assembly and an antenna assembly with an antenna. By means of the energy generated as a result of actuation, it is possible to generate signals through a motion of the magnetic element 2 from the first Y1 to the second Y2 support position or vice versa. For this purpose, the energy of the transmitter assembly is provided, for example, by means of contacting elements.

For example, the invention-based induction generator can be advantageously designed in one piece as a module, wherein the induction generator consists, for example, of the induction coil 4, the coil core 5, the guiding device, the bar-shaped spring mechanism 15 and the magnetic element 2.

According to the invention, the induction generator is designed in such a way that a release of the magnetic element 2 from the legs 6, 7 can only be determined through a specific amount of force which is built up in the first mechanical spring mechanism 12. Depending on production tolerances of individual parts or magnetic force frictional dispersion, said amount of force can fluctuate which can result in switching point inaccuracy.

In order to increase the switching point accuracy, the induction generator can be designed in such a way that, for example, in an actuation on a definite path (=switching point) only 90% of the force required for conversion is stored in the first mechanical spring mechanism 12. The remaining 10% of the force can be added through direct actuation of the magnetic element 2.

For example, constructively this can be realized in such a way that from the force transmission element 13, particularly its upper end, a rigid bar is designed in the direction of the magnetic element 2 which according to a defined path corresponding to an elastic deformation of the first mechanical spring mechanism presses directly on the magnetic element 2 and, in a further actuation, sets it in motion.

In summary, according to the invention, an induction generator is provided which, because of the linear movement of the magnetic element 2, can be assembled in small and simple fashion between two defined support positions Y1, Y2, wherein the induction generator allows for the possibility of mechanically supporting an accelerated motion of the magnetic element 2 in such a way that a high amount of energy can be achieved. The invention-based bar-shaped spring mechanism 15 in particular makes it possible to realize a compact design.

REFERENCE NUMERALS

1 Induction system
2 Magnetic element
3 permanent magnet
4 induction coil
4a front end adjoining the ends of the legs
4b front end facing away from the ends of the legs
5 coil core
6 first leg
6a external side
6b internal side
7 second leg
7a external side
7b internal side
8a, b, c support elements
9, 10, 11 pole shoes
10a, b end sections of pole shoe
12 first mechanical spring mechanism
12a first end portion
12b end (second end) coupled with the magnetic element
13 engagement member
14a stationary end portion
14b end portion connected to the first end
15 bar-shaped spring element
15a force-application area
Y1, Y2 support positions
Y intended direction of motion
S, N magnetic poles
A central axis
F actuating force

The invention claimed is:

1. An induction generator for a radio-controlled switch comprising:
 a magnetic element; and
 two induction coils with a common coil core;
 wherein the coil core has a U-shaped design;
 wherein a first support position and a second support position are defined for the magnetic element at legs of the coil core;
 wherein, during the process of changing positions, a flow direction reversal takes place respectively in the coil core;
 wherein the magnetic element is movably arranged in a direction in which the legs may each contact the magnetic element in one of the support positions;
 wherein the magnetic element is coupled to front ends of the two induction coils;
 wherein for mechanically accelerated motion between support positions, the magnetic element interacts with a first mechanical spring mechanism, which stores activation energy up to a specific energy level;
 wherein the magnetic element can be released from the first or the second support position when the specific energy level has been exceeded, which energy level can be released when leaving the support position for accelerating the magnetic element;
 wherein the induction generator comprises a second mechanical spring mechanism for generating a reset force in order to move the magnetic element from the second to the first support position which is formed integrally with or connected to the first mechanical spring mechanism; and
 wherein the second mechanical spring mechanism is embodied to be pretensioned in the first support position of the magnetic element in a direction opposite to an actuating force direction.

2. The induction generator according to claim 1, wherein the magnetic element comprises three support elements of differing magnetic polarity, wherein two adjoining support elements can be brought in position at the legs in each support position.

3. The induction generator according to claim 1, wherein the magnetic element is arranged at the induction generator in linear movable fashion based on a guiding device.

4. The induction generator according to claim 1, wherein the magnetic element comprises an E-shaped cross section.

5. The induction generator according to claim 1,
 wherein each of the legs of the coil core extends between two adjoining support elements of the magnetic element; and
 wherein the magnetic element comprises an E-shaped cross section.

6. The induction generator according to claim 1,
 wherein the first and the second spring mechanism are designed in one piece as a bar-shaped spring element; and
 wherein a force-application area has been provided in a central area of the bar-shaped spring element.

7. The induction generator according to claim 1,
 wherein the bar-shaped spring element extends in a direction in which the legs are adjoining each other from a first front end of the induction coil to a second front end adjacent to the magnetic element;
 wherein a first end of the bar-shaped spring element is supported at the first end; and
 wherein a second end is connected with the magnetic element for introducing a force in the direction in which the legs are adjoining each other.

8. A radio-controlled switch with a transmitter assembly and an antenna, wherein the radio-controlled switch comprises an induction generator according to claim 1.

* * * * *